United States Patent [19]  [11]  4,277,352
Allison et al.  [45]  Jul. 7, 1981

[54] DEMULSIFICATION OF EMULSIONS PRODUCED FROM SURFACTANT RECOVERY OPERATIONS AND RECOVERY OF SURFACTANTS THEREFROM

[75] Inventors: Jean B. Allison; Mohan V. Kudchadker, both of Houston; Lawrence E. Whittington, Katy, all of Tex.

[73] Assignee: Texaco Inc., White Plains, N.Y.

[21] Appl. No.: 24,000

[22] Filed: Mar. 26, 1979

[51] Int. Cl.$^3$ .............................................. E21B 43/22
[52] U.S. Cl. .............................. 252/8.55 D; 166/266; 252/331; 252/332
[58] Field of Search .................. 252/8.55 D, 327, 331, 252/332; 166/266, 267

[56] References Cited

U.S. PATENT DOCUMENTS

| 2,615,853 | 10/1952 | Kirkpatrick et al. | 252/331 |
| 2,882,973 | 4/1959 | Doscher et al. | 166/266 |
| 3,712,377 | 1/1973 | Hill et al. | 116/273X |
| 3,811,507 | 5/1974 | Flournoy et al. | 252/8.55 X |
| 3,835,060 | 9/1974 | Maddox et al. | 252/332 |
| 3,914,484 | 11/1959 | Monson et al. | 252/331 |
| 4,018,278 | 4/1977 | Shupe | 252/8.55 X |
| 4,029,570 | 6/1977 | Coffman et al. | 166/267 X |
| 4,089,803 | 5/1978 | Bessler | 252/8.55 X |
| 4,110,228 | 8/1978 | Tyler et al. | 252/8.55 |

FOREIGN PATENT DOCUMENTS 51-96785  8/1976  Japan ....................... 252/332

Primary Examiner—Herbert B. Guynn
Attorney, Agent, or Firm—Carl G. Ries; Robert A. Kulason; Charles L. Bauer

[57] ABSTRACT

Treatment of emulsions of oil and water produced from surfactant recovery operations whereby the produced emulsions containing surfactants are demulsified and the surfactants are recovered in the water phase.

4 Claims, No Drawings

DEMULSIFICATION OF EMULSIONS PRODUCED FROM SURFACTANT RECOVERY OPERATIONS AND RECOVERY OF SURFACTANTS THEREFROM

BACKGROUND OF THE INVENTION

This invention relates to the treatment of oil-water emulsions that are produced as a result of tertiary or enhanced recovery operations that employ anionic surfactants.

Surfactant flooding has become one of the more promising enhanced recovery techniques for recovering oil after waterflooding. Generally the method employs the injection of a slug of surfactant such as a petroleum sulfonate contained in an aqueous medium, followed by a drive fluid such as water. Variations may include following the surfactant slug with an aqueous polymer slug employing a polysaccharide or polyacrylamide for mobility control. In the surfactant flooding enhanced recovery is realized, it is believed, principally because of the effectiveness of the surfactant to reduce the interfacial tension between the crude oil and water. Although anionic, cationic and nonionic surfactants and mixtures thereof have been suggested, the anionic surfactants, and particularly the petroleum sulfonates, have gained the widest recognition as surfactant additives.

The liquids produced as a result of a tertiary recovery operation involving the use of surfactant or micellar flooding are generally oil-water emulsions that are very stable especially since they may contain surfactants such as a petroleum sulfonate which had been injected into the formation as a recovery agent for enhancing recovery of oil therefrom.

While it is desired that the surfactants concentrate at the oil-water interfaces during the flooding operation, under certain conditions the surfactants become more oil-than-water soluble, and thus concentrate in the oil phase. Not only do the surfactants lose their effectiveness but also considerable quantities of surfactants are contained in the produced crude oil. While surfactant flooding has shown promise for enhancing oil recovery, the economics necessary for commercial application require that the costs of the surfactant be minimized.

It is thus an object of the present invention to reduce the expenses related to the surfactant by providing a method for the recovery of the surfactants from the oil phase of the produced emulsion.

It is a further object of this invention to recycle the recovered concentrated surfactant of additional tertiary recovery operations.

It is yet another object of this invention to provide a produced crude oil having reduced surfactant concentration present so that the crude oil may be processed in refining operations without additional pretreatment for removal of the surfactants.

SUMMARY OF THE INVENTION

In accordance with the invention, emulsions of oil-water that are produced as a result of enhanced recovery operations that employ the injection of an anionic surfactant are treated so as to recover the surfactant by concentrating it in an aqueous carrier thereby providing a source of an aqueous solution of surfactant for further enhanced recovery and simultaneously providing an oil for refinery processing having a reduced concentration of surfactant therein.

DESCRIPTION OF THE PREFERRED EMBODIMENT

This invention relates to the recovery of anionic surfactants from fluids produced as a result of a surfactant flood. The invention can be employed to advantage to produced crude oil and water emulsions so that the water phase therefrom can be utilized as a carrier for the recovered surfactant for use in additional tertiary recovery operations and the oil can be supplied to refinery processing without undergoing further treatment to remove the anionic surfactants.

By the invention, the surfactants contained in the produced fluids from a surfactant flood are concentrated in a water phase while simultaneously their concentration is reduced in the crude oil phase to levels for refinery processing prior to the transportation of the oil from the producing field. The invention comprises extracting the surfactants from the crude oil with solubilizers, whereby partitioning of the surfactant occurs into the water phase or aqueous contacts which can then be utilized for additional surfactant recovery. The anionic surfactant may be a petroleum surfactant, i.e., a mixture of alkylaryl sulfonates and optionally may contain a solubilizer. Further, the surfactant may be a synthetic surfactant such as an alkoxylated alkyl phenol sulfonate, an alkoxylated alkyl phenol sulfate, an alkoxylated sulfonated alcohol, or an alkoxylated sulfated alcohol or mixtures thereof. The solubilizers that are effective in this invention include the water-soluble alcohols or polyhydric alcohols, ether alcohols, alkoxylated phenols and alkoxylated alkyl phenols, alkoxylated alcohols, polyalkoxylated mercaptans, as well as the sulfated or sulfonated derivatives of the alkoxylated phenols or the alkoxylated alcohols. The alcohols are of the type that have from 3 to 16 carbon atoms in the molecule. With respect to the alkoxylated alkyl phenols, these have from 1 to 20 ethylene or propylene oxide groups in the molecule requisite to give the required water-solubility.

These solubilizers have the ability not only to repartition anionic surfactants that have been partitioned into the oil phase during the in-situ recovery operation but also to redissolve divalent sulfonate salts that may have precipitated because of the high concentration levels of brine or the presence of calcium or magnesium salts in the connate water during the in-situ operation.

The following laboratory test demonstrates the effectiveness of an aqueous solution of a solubilizer to repartition a sulfonate surfactant from the oil phase into the water phase of an oil-water emulsion. In the test, an aqueous brine solution containing a polysaccharide was prepared to simulate a polymer or mobility control slug. The polymer solution contained 6,000 g/m$^3$ of sodium chloride and 700 g/m$^3$ of a polysaccharide (Xanflood). A portion of this brine solution, to serve as the standard for comparison, was placed in contact with a sample of a 32° API crude containing 775 mg of a calcium petroleum sulfonate and 190 mg of a sodium petroleum sulfonate. To a second portion of the brine solution was added a nonionic solubilizer (ethoxylated nonylphenol) having an average of 12.0 moles of ethylene oxide per mole of nonylphenol in amounts to give a concentration of 10,000 g/m$^3$. This portion was also placed in contact with an oil sample containing a calcium and a sodium petroleum sulfonate. Both solutions were agitated gently for one week, after which the oil and the water phases were analyzed for surfactant. The results showing the extraction of the sulfonate are presented in the following table.

EXTRACTION OF PETROLEUM SULFONATES FROM OIL WITH POLYMER SOLUTIONS CONTAINING SOLUBILIZER

| Test | Solubilizer Conc. (g/m$^3$) | Quantity of Petroleum Sulfonate | | | |
|---|---|---|---|---|---|
| | | In Oil Phase Initial (mg) | In Aqueous Phase | | |
| | | | Initial (mg) | Final (mg) | Percent Recovery |
| (Standard) | 0 | 37 | 0 | 5 | 14% |
| Solubilizer | 10,000 | 37 | 0 | 36.3 | 98% |

The results show that initially all of the surfactant was in the oil phase in the form of calcium and sodium petroleum sulfonate. However, after one week, the polymer solubilizer solution had extracted 98% of these sulfonates. In contrast, the solution containing no solubilizer had recovered only 14% of the surfactant.

These results demonstrate that solubilizers such as the ethoxylated nonylphenols can recover essentially 100% of the calcium or sodium petroleum sulfonates from an oil sample by a simple extraction process.

In a second demonstration the effectiveness of solubilizers to reclaim petroleum sulfonates was demonstrated where high concentrations of calcium and magnesium ions were present. The test procedure described above was again employed, with the difference being that samples were being filtered prior to analyses. A 10 cc sample of a 32° API crude oil containing 3,700 g/m$^3$ sulfonate as calcium and sodium salts was equilibrated with 25 cc of brine. The brine contained 48,400 g/m$^3$ chloride, 3,250 g/m$^3$ calcium ion, and 12,409 g/m$^3$ magnesium ion. To given amounts of this mixture were added a solubilizer, an ethoxylated nonylphenol. After equilibrium, samples of the brine were analyzed for sulfonate. The results are shown in the following table.

EXTRACTION OF CALCIUM AND SODIUM PETROLEUM SULFONATES FROM OIL AND BRINE MIXTURES WITH BRINE CONTAINING SULFONATES

| Solubilizer Present | Solubilizer Conc. (g/m$^3$) | Quantity of Petroleum Sulfonate | | | |
|---|---|---|---|---|---|
| | | In Oil Phase Initial (mg) | In Aqueous Phase | | |
| | | | Initial (mg) | Final (mg) | Percent Recovery |
| None (Standard) | 0 | 37 | 0 | 0 | 0 |
| Surfonic N-120[1.] | 5,000 | " | 0 | 36.2 | 98% |
| | 10,000 | " | 0 | 36.2 | 98% |
| | 15,000 | " | 0 | 39.4 | 106% |
| Surfonic N-200[2.] | 1,000 | " | 0 | 0 | 0 |
| | 5,000 | " | 0 | 40.6 | 109% |
| | 10,000 | " | 0 | 40.0 | 108% |

[1.]Surfonic N-120; an ethoxylated nonylphenol having an average of 12 ethoxy groups per molecule (Jefferson Chemical Co.)
[2.]Surfonic N-200; an ethoxylated nonylphenol having an average of 20 ethoxy groups per molecule (Jefferson Chemical Co.)

The results demonstrate that with the presence of solubilizers in oil-water emulsions, the calcium and sodium salts of petroleum sulfonates become much more water than oil-soluble even in aqueous phases that contain high concentrations of total dissolved solids.

These results also demonstrate that a large increase in salinity and hardness has a great effect on the solubility of the surfactant in the aqueous phase. Namely, The field brine could not extract measurable quantities of the petroleum sulfonates until solubilizers in concentrations exceeding 1,000 g/m$^3$ were added to the system. These results showed that substantially complete reclamation of the petroleum sulfonates is possible at higher concentrations despite the fact that the system contains a high salinity and hardness.

In yet another test the effectiveness of solubilizers on the partitioning of alkali metal sulfonates from crude oil into an aqueous phase was demonstrated. One sample of a 32° API oil containing 5,000 g/m$^3$ of metal sulfonates (calcium and sodium) was collected from the production well of a recovery field test, in which an aqueous slug containing a petroleum sulfonate had been injected into the formation via the injection well. A second sample using the same 32° API oil obtained from the same well prior to undertaking a tertiary recovery operation was prepared by adding to the oil 925 g/m$^3$ of a sodium sulfonate. Each sample was equilibrated with equal volumes of deionized water containing 5,000 g/m$^3$ of an ethoxylated nonylphenol (Surfonic-106). From each oil sample a 10 cc portion was taken and layered on an aqueous layer. The samples were gently stirred for three days, after which aliquots of the aqueous layers were analyzed for sulfonate. The results are shown in the following table.

EFFECT OF SURFONIC N-106 ON PARTITIONING OF METAL SULFONATES

| Oil Sample | Solubilizer (g/m$^3$) | Sulfonate in Aqueous Phase after three days (g/m$^3$) |
|---|---|---|
| Oil sample #1 | 0 | 125 |
| Oil sample #1 | 5,000 | 175 |
| Oil sample #2 | 0 | 325 |
| Oil sample #2 | 5,000 | 780 |

These results demonstrate that the addition of a solubilizer to the aqueous phase increases the amount of metal sulfonates that can be reclaimed from the crude oil by partitioning into the water phase.

In its broadest aspect this invention relates to a method for recovering anionic surfactants from the produced fluids of a surfactant waterflood wherein the fluids are treated with a solubilizer so as to partition and extract the surfactants from the oil phase into the water phase. In practicing the invention it is recommended that the solubilizer be added to the produced fluids in an amount of from about 0.05 wt. % to about 5.0 wt. % of the fluid being treated. It is preferred that the concentration of the solubilizer be in the range of from about 0.1 wt. % to about 1.0 wt. %. The produced fluids can be treated in a conventional field treater. The operation may be conducted at ambient temperatures or up to about 200° F. and atmospheric pressure. By the instant process, the desired amount of the solubilizer, which may be contained in an aqueous carrier, is added to the produced oil and water emulsion. The solubilizer may be added, for example, by proportioning pumps. Stirring means is desirable to facilitate mixing. After suitable time has elapsed to allow for partitioning to occur, the oil may be removed by means of an overflow weir. The separated water now containing very little of the previously emulsified oil, but concentrated with the anionic surfactant is available for recycling to an injection well for continuing the enhanced recovery process and additional oil recovery. The crude on the other hand, with its concentration of surfactant substantially reduced may be pipelined or transported to a refinery for processing.

The resultant aqueous surfactant-solubilizer solution may first be further concentrated to the desired optimum level by concentration techniques such as evaporation. Alternatively, additional surfactants and appropriate additives may be added to obtain the desired composition and concentration for injection of the surfactant into the formation for further enhanced oil recovery. This system will have an added advantage of tolerance to higher salinities and hardness conditions due to the presence of the solubilizer. Such systems would be of particular benefit in reservoirs which previously required a preflush to condition the reservoir to lower salinities and hardness. Also, the presence of the solubilizer will eliminate the need for a new preflush and can suppress the partitioning of the surfactant into oil.

It is intended that various changes may be made in this invention in the practical development thereof, if desired. Such changes are comprehended within the meaning of the following claims. The invention, therefore, is not to be restricted except as is necessitated by the prior art.

We claim:

1. In an enhanced recovery process for the recovery of oil from a subterranean oil-bearing formation employing the injection of an aqueous slug comprising a petroleum sulfonate surfactant whereby an emulsion of oil and water is produced containing said surfactant in the oil phase from said formation, the method of treating said produced emulsion with a water soluble solubilizing agent selected from the group consisting of water-soluble alcohols or polyhydric alcohols, alkoxylated phenols, alkoxylated alkyl phenols, alkoxylated alcohols, polyoxyalkylated mercaptans, sulfated or sulfonated derivatives of alkoxylated phenols, the sulfated or sulfonated derivatives of the alkoxylated alcohols and mixtures thereof, wherein said solubilizing agent is contained in an aqueous medium thereby extracting said surfactant from said emulsion and partitioning said surfactant into said aqueous medium, said aqueous medium being recycled to said oil-bearing formation to continue said enhanced recovery process.

2. The method of claim 1 wherein said aqueous slug contains fresh water, a saline solution or mixtures thereof.

3. The method of claim 1 wherein said aqueous medium contains said solubilizing agent in the amount of about 0.05 wt. % to about 5.0 wt. %.

4. The method of claim 3 wherein said aqueous medium contains said solubilizing agent in amounts from about 0.1 wt. % to about 1.0 wt. %.

* * * * *